(12) United States Patent
Chen et al.

(10) Patent No.: US 8,355,555 B2
(45) Date of Patent: Jan. 15, 2013

(54) SYSTEM AND METHOD FOR MULTI-IMAGE BASED VIRTUAL NON-CONTRAST IMAGE ENHANCEMENT FOR DUAL SOURCE CT

(75) Inventors: Yunqiang Chen, Plainsboro, NJ (US); Tong Fang, Morganville, NJ (US); Bernhard Schmidt, Fürth (DE); Rainer Raupach, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 367 days.

(21) Appl. No.: 12/854,341

(22) Filed: Aug. 11, 2010

(65) Prior Publication Data
US 2011/0064292 A1 Mar. 17, 2011

Related U.S. Application Data

(60) Provisional application No. 61/243,289, filed on Sep. 17, 2009.

(51) Int. Cl.
*G06K 9/00* (2006.01)
(52) U.S. Cl. ....................................................... 382/131
(58) Field of Classification Search .................. 382/131, 382/132
See application file for complete search history.

(56) References Cited

U.S. PATENT DOCUMENTS

| 7,649,981 | B2 * | 1/2010 | Seppi et al. | 378/158 |
| 2006/0088198 | A1 * | 4/2006 | Arnold | 382/131 |
| 2010/0135453 | A1 * | 6/2010 | Mendonca et al. | 378/5 |

* cited by examiner

*Primary Examiner* — Gerald J. O'Connor
*Assistant Examiner* — Neha Patel
(74) *Attorney, Agent, or Firm* — Donald B. Pachburg

(57) ABSTRACT

A method for enhancing a virtual non-contrast image, includes receiving a pair of dual scan CT images and calculating a virtual non-contrast image from the pair of CT images using known tissue attenuation coefficients. A conditional probability distribution is estimated for tissue at first and second points in each of the pair of CT images and the virtual non-contrast image as being the same type. A conditional probability distribution for tissue is estimated at the first and second points in each of the pair of CT images and the virtual non-contrast image as being of different types. An a posteriori probability of the tissue at the first and second points as being the same type is calculated from the conditional probability distributions, and an enhanced virtual non-contrast image is calculated using the a posteriori probability of the tissue at the first and second points as being the same type.

16 Claims, 4 Drawing Sheets

SYSTEM AND METHOD FOR MULTI-IMAGE BASED VIRTUAL NON-CONTRAST IMAGE ENHANCEMENT FOR DUAL SOURCE CT

CROSS REFERENCE TO RELATED UNITED STATES APPLICATIONS

This application claims priority from "Multi-image Based Virtual Non-contrast Image Enhancement for Dual Source CT", U.S. Provisional Application No. 61/243,289 of Chen, et al., filed Sep. 17, 2009, the contents of which are herein incorporated by reference in their entirety.

TECHNICAL FIELD

This disclosure is directed to dual source computed tomographic (CT) imaging, specifically to the enhancement of virtual non-contrast images acquired through dual source CT scanning.

DISCUSSION OF THE RELATED ART

The introduction of Dual Source Computed Tomography (DSCT) in 2005 was a significant improvement in the field of CT imaging. Two x-ray sources operated simultaneously enable heart-rate independent temporal resolution and routine spiral dual energy imaging. The precise delivery of contrast media is a critical part of the contrast-enhanced CT procedure. Dual Source CT scanners allow higher temporal resolution by acquiring a full CT slice in only half a rotation, thus reducing motion blurring at high heart rates and potentially allowing for shorter breath-hold time.

A typical dual source CT scanner has two X-ray sources at right angle to each other. With a single source CT scanner, the X-ray source/detector system has to obtain data projections of 180 degrees to take a cardiac image. With the Dual Source CT, each of the two source/detector combinations only needs to travel 90 degrees, hence double the speed, to acquire diagnostic images of the heart. In addition, filters on the scanner can diffuse radiation away from the patient. That feature, plus the decreased exposure time, can reduce radiation by up to 75 percent compared to the 64-slice CT.

Dual source CT can provide new functionality with respect to traditional CT scanners. Dual source CT scanning enables the acquisition of cardiac images without the need to administer beta-blockers to patients to slow the heart rate. Even at rest, a heart beats at about 70-75 beats per minute (bpm), too fast for a single source CT scanner, even a 64-slice CT scanner, to visualize the heart without motion artifacts. As a result, beta-blockers have been given to patients with heartbeats greater than 60-65 bpm to slow down their heart rates.

In addition to its speed, the Dual Source CT offers the ability to better characterize soft tissues. Because X-ray absorption is energy-dependent, changing the energy level of the X-ray source results in a material-specific change of attenuation. With two X-ray sources scanning at different energy levels at the same time, the Dual Source CT scanner acquires two data sets with different attenuation levels simultaneously. Using dual-energy technology, one tube could be set at 120 kVp, while the other is set at 80 kVp. At those two energy levels, calcium and contrast will not have the same Hounsfield unit attenuation. Reconstructed images can subtract either the calcium or the contrast medium, essentially creating virtual non-contrast images. The material-specific difference in attenuation can facilitate classification of different tissue types and can help in the characterization and differentiation of different types of atherosclerotic plaque, e.g. calcified and non-calcified plaque. This can improve risk stratification of cardiovascular patients.

Similarly, dual energy scanning can remove structures that interfere with visualization, such as bone at the skull base in a CTA of the head. Current software can remove the bone but it does not eliminate the associated streak artifacts. Dual-energy scanning can strip away bone as if it is not there, leaving no artifacts. Dual-energy scanning can also improve the imaging of perfusion of organs, such as the brain or heart, and tumors. Images can be reconstructed to show only where the iodine has traveled, and pixel intensities can mark the degree of perfusion. Current CT perfusion imaging requires heavy doses of radiation. The dual-energy technique can reduce that output.

As mentioned above, virtual non-contrast imaging (VNC) is a new functionality of dual source CT scanning. With only one CT scan with a contrast medium injected, one can simultaneously obtain two images (i.e., $I_H$ and $I_L$) from the high and low X-ray energy spectrum respectively. These images can be formulated as follows:

$$I_H(x) = a(x) \cdot I_{VNC}(x) + b(x) \cdot I_C(x),$$

$$I_L(x) = c(x) \cdot I_{VNC}(x) + d(x) \cdot I_C(x),$$

where $I_{VNC}$ is the body tissue without contrast medium, $I_C$ is the image resulting from the contrast medium, x is a pixel in the images, and a, b, c, d are the known absorption coefficients of different tissue material to high and low energy X-rays, with and without contrast media. The contrast medium age can be separated from body tissue as follows (suppressing the x-dependence):

$$I_{VNC} = \frac{(d \cdot I_H - b \cdot I_L)}{ad - bc}. \tag{1}$$

The $I_{VNC}$ is referred to herein as a virtual non-contrast image (VNC), according to an embodiment of the invention. Note that the dual source CT needs only one scan with the contrast medium injected to obtain both a non-contrast image and a contrast enhanced image, while traditional CT's need two scans, one before and one after the contrast medium injection. Dual source CT hence can overcome the challenges associated with complicated non-rigid tissue motion between two scans by traditional CT's.

However, there is one issue associated with the VNC image. Due to the subtraction step in EQ. (1), the imaging noise in dual energy images adds while the signal is partially cancelled out, which causes the signal to noise ratio of the VNC image to drop significantly. Hence, the VNC image quality may be enhanced by appropriately designed image enhancements and noise reduction algorithms.

SUMMARY OF THE INVENTION

Exemplary embodiments of the invention as described herein generally include methods and systems for enhancing virtual non-contrast images acquired through dual source CT scanning.

According to an aspect of the invention, there is provided a method for enhancing a virtual non-contrast image, including the steps of receiving a pair of computed tomography (CT) images acquired using a dual-scan CT apparatus, calculating a virtual non-contrast image from the pair of CT images using known tissue attenuation coefficients, estimating a conditional probability distribution for tissue at a first point in each of the pair of CT images and the virtual non-contrast image and for tissue at a second point in each of the pair of CT images and the virtual non-contrast image as being the same type, estimating a conditional probability distribution for tissue at a first point in each of the pair of CT images and the virtual non-contrast image and for tissue at a second point in each of the pair of CT images and the virtual non-contrast image as being of different types, calculating from the conditional probability distributions an a posteriori probability of the tissue at the first point and the second point as being the same type, and calculating an enhanced virtual non-contrast image using the a posteriori probability of the tissue at the first point and the second point as being the same type.

According to a further aspect of the invention, a first image of the pair of images is acquired at a higher energy than a second image of the pair of images, where each image comprises a plurality of intensities defined on an N-dimensional grid of points.

According to a further aspect of the invention, the a posteriori probability of the tissue at the first point and at the second point as being the same type is $$P(\lambda_x = \lambda_y \mid \|O(y) - O(x)\|) = \frac{c \cdot P(\|O(y) - O(x)\| \mid \lambda_x = \lambda_y)}{c \cdot P(\|O(y) - O(x)\| \mid \lambda_x = \lambda_y) + (1-c) \cdot P(\|O(y) - O(x)\| \mid \lambda_x \neq \lambda_y)}$$

where $P(\|O(y)-O(x)\| \mid \lambda_x=\lambda_y)$ is the conditional probability distribution for tissue at the first point and at the second point as being of the same type, $P(\|O(y)-O(x)\| \mid \lambda_x \neq \lambda_y)$ is the conditional probability distribution for tissue at the first point and at the second point as being of different types, y is the first point, x is the second point, O(p) is an vector formed from the intensity of the first image at point p, the intensity of the second image at point p, and the intensity of the virtual non-contrast image at point p, $\lambda_p$ is the likelihood of the tissue at point p being of a particular type, where p is either y or x, and c represents a predetermined prior probability $P(\lambda_x=\lambda_y)$.

According to a further aspect of the invention, the enhanced virtual non-contrast image is calculated as $$\tilde{I}_{VNC}(x) = \frac{\sum_{y \in N_x} I_{VNC}(y) \cdot P(\lambda_x = \lambda_y \mid \|O(y) - O(x)\|)}{\sum_{y \in N_x} P(\lambda_x = \lambda_y \mid \|O(y) - O(x)\|)},$$

where $\tilde{I}_{VNC}(x)$ is the intensity of the enhanced virtual non-contrast image at point x, $I_{VNC}(y)$ is the intensity of the virtual non-contrast image at point y, $P(\|O(y)-O(x)\| \mid \lambda_x=\lambda_y)$ is the a posteriori probability of the tissue at the first point and at the second point as being the same type, y is the first point, x is the second point, O(p) is an vector faulted from the intensity of the first image at point p, the intensity of the second image at point p, and the intensity of the virtual non-contrast image at point p, and $\lambda_p$ is the likelihood of the tissue at point p being of a particular type, where p is either y or x.

According to a further aspect of the invention, the conditional probability distribution for tissue at the first point and at the second point as being of the same type is a Gaussian distribution.

According to a further aspect of the invention, the conditional probability distribution for tissue at the first point and at the second point as being of different types is a uniform distribution.

According to a further aspect of the invention, the virtual non-contrast image $I_{VNC}$ is calculated as $$I_{VNC} = \frac{(d \cdot I_1 - b \cdot I_2)}{ad - bc},$$

where a and c are tissue attenuation coefficients for the virtual non-contrast image for the first and second images, respectively, and b and d are tissue attenuation coefficients in the presence of a contrast medium for the first and second images, respectively.

According to another aspect of the invention, there is provided a method for enhancing a virtual non-contrast image, including the steps of receiving a pair of computed tomography (CT) images acquired using a dual-scan CT apparatus, where a first image of the pair of images is acquired at a higher energy than a second image of the pair of images, where each image comprises a plurality of intensities defined on an N-dimensional grid of points, calculating a virtual non-contrast image from the pair of CT images using known tissue attenuation coefficients, calculating an enhanced virtual non-contrast image from $$\tilde{I}_{VNC}(x) = \frac{\sum_{y \in N_x} I_{VNC}(y) \cdot P(\lambda_x = \lambda_y \mid \|O(y) - O(x)\|)}{\sum_{y \in N_x} P(\lambda_x = \lambda_y \mid \|O(y) - O(x)\|)},$$

where $\tilde{I}_{VNC}(x)$ is the intensity of the enhanced virtual non-contrast image at point x, $I_{VNC}(y)$ is the intensity of the virtual non-contrast image at point y, $P(\|O(y)-O(x)\| \mid \lambda_x=\lambda_y)$ is an a posteriori probability of the tissue at the first point and at the second point as being the same type, y is the first point, x is the second point, O(p) is an vector formed from the intensity of the first image at point p, the intensity of the second image at point p, and the intensity of the virtual non-contrast image at point p, where p is either y or x, and $\lambda_p$ is the likelihood of the tissue at point p being of a particular type.

According to a further aspect of the invention, $P(\|O(y)-O(x)\| \mid \lambda_x=\lambda_y)$ is calculated as $$P(\lambda_x = \lambda_y \mid \|O(y) - O(x)\|) = \frac{c \cdot P(\|O(y) - O(x)\| \mid \lambda_x = \lambda_y)}{c \cdot P(\|O(y) - O(x)\| \mid \lambda_x = \lambda_y) + (1-c) \cdot P(\|O(y) - O(x)\| \mid \lambda_x \neq \lambda_y)}$$

where $P(\|O(y)-O(x)\| \mid \lambda_x=\lambda_y)$ is a conditional probability distribution for tissue at the first point and at the second point as being of the same type, $P(\|O(y)-O(x)\| \mid \lambda_x \neq \lambda_y)$ is the conditional probability distribution for tissue at the first point and at the second point as being of different types, and c represents a predetermined prior probability $P(\lambda_x=\lambda_y)$.

According to another aspect of the invention, there is provided a program storage device readable by a computer, tangibly embodying a program of instructions executable by the computer to perform the method steps for enhancing a virtual non-contrast image.

DETAILED DESCRIPTION OF EXEMPLARY EMBODIMENTS

Figure 1:
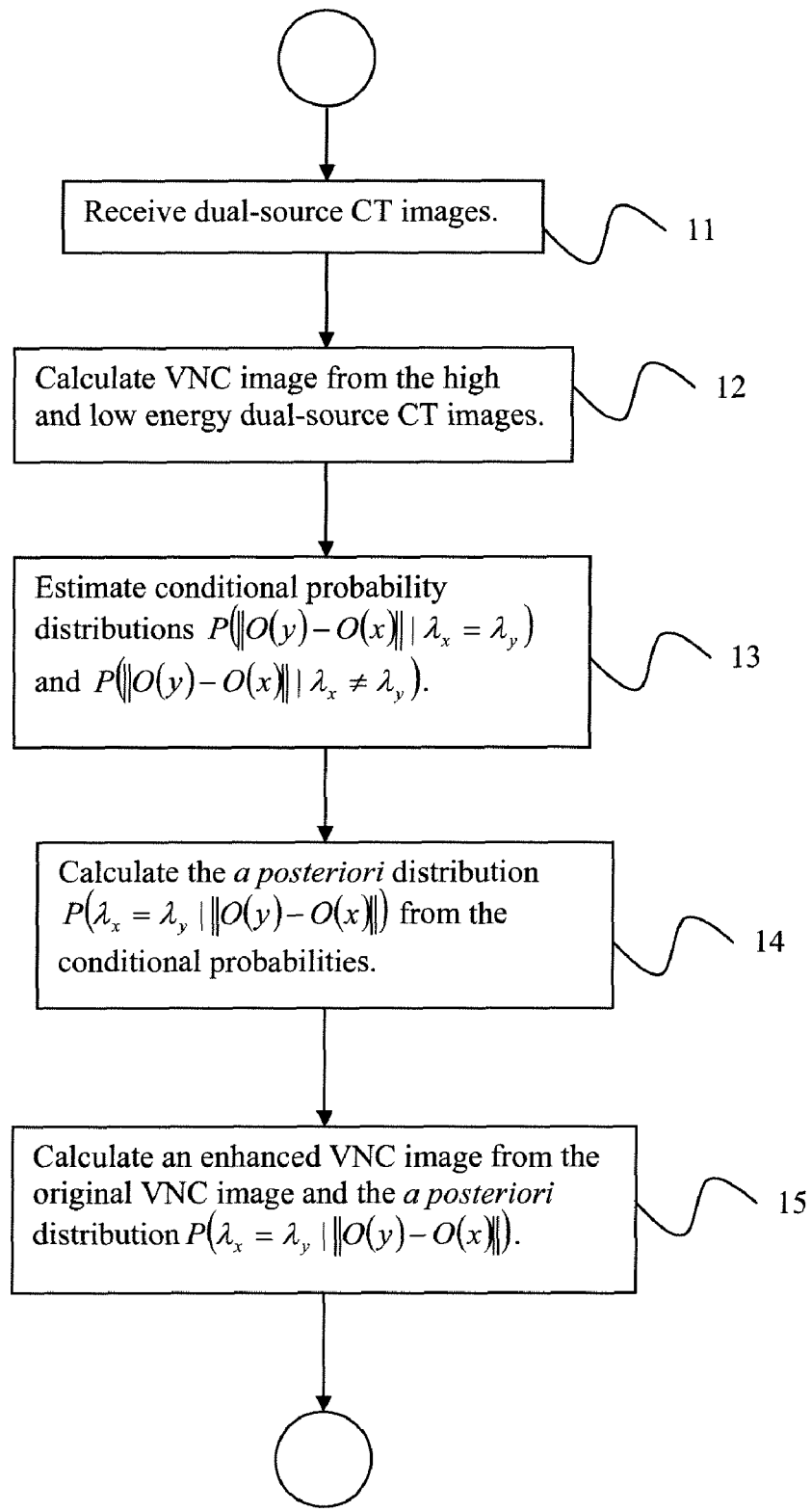
FIG. 1 is a flowchart of a method for virtual non-contrast images acquired through dual source CT scanning, according to an embodiment of the invention.

Exemplary embodiments of the invention as described herein generally include systems and methods for virtual non-contrast images acquired through dual source CT scanning. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

VNC Image Enhancement

Normally, image noise is both zero mean and highly independent between neighboring pixels, while the body tissue is smooth in most regions except the boundaries. Hence a low-pass type of filtering can reduce the noise while maintaining the body tissue structures. To prevent blurring across structure boundaries, pixels need to be classified to determine which pixels belong to same tissue (and hence should have similar intensity) before conducting the low-pass filtering.

Traditional adaptive filtering algorithms try to obtain the classification from the input image itself. When the signal-to-noise ratio is low, such classification is not reliable and hence cannot provide optimal results.

It is worth noting that in the dual source CT scenario, the original high/low energy scans are also available. These scans are images of the same structure but with much higher signal-to noise ratio. Thus, one can design a new type of adaptive filtering algorithm by incorporating multiple images, including the input image and the high energy and low energy images into the processing.

Adaptive Filtering Based on Tissue Classification

A probabilistic filtering framework for incorporating classification information can be provided as follows. Consider filtering a pixel at a location x. One needs to find all pixels in a local neighborhood that are very likely to be of the same tissue as pixel x. Since the classification cannot be perfect, a probability is used to represent the likelihood. Assuming this probability is known for every pixel y in the neighborhood (described in the next section) and is represented as $P(\lambda_x=\lambda_y)$ a probabilistic low-pass filtering of the VNC image can be performed as follows:

$$\tilde{I}_{VNC}(x) = \frac{\sum_{y \in N_x} I_{VNC}(y) \cdot P(\lambda_x = \lambda_y)}{\sum_{y \in N_x} P(\lambda_x = \lambda_y)}. \quad (2)$$

The new value $\tilde{I}_{VNC}(x)$ can replace the original VNC image intensity $I_{VNC}(x)$ at location x. This procedure can reduce the noise in the VNC image. Since the final image quality depends on the classification result, obtaining an accurate classification result is critical.

Tissue Classification Based on Multiple Images

As described above, the VNC image has very low signal to noise ratio. It is important to incorporate both the high energy image and low energy image to improve the classification result.

For pixel at a given location (e.g., x), 3 values from all images form an observation vector $O(x)=[I_H(x), I_L(x), I_{VNC}(x)]$. For a pixel y that belongs to the same tissue as pixel x, O(y) should have similar observation as O(x). Due to imaging noise, they are not likely to have identical values, but rather follow a probabilistic distribution. There could be different distribution models for different imaging settings. To illustrate an algorithm according to an embodiment of the invention, a simplified model is assumed to hold here. Assuming the imaging noise is Gaussian distributed, one has:

$P(\|O(y)-O(x)\| | \lambda_x=\lambda_y)=g(\|I_H(y)-I_H(x)\|,\|I_L(y)-I_L(x)\|,$
$\quad \|I_{VNC}(y)-I_{VNC}(x)\|),$ where g( ) represents a Gaussian function. In this model, the mean is 0 and the standard deviation may be set based on the imaging noise distribution, based on experience, and may be tuned.

In addition, according to an embodiment of the invention, it may be assumed that the distribution of the intensity differences between different tissue is uniformly distributed as follows:

$P(\|O(y)-O(x)\| | \lambda_x \neq \lambda_y)=\sigma.$

Combining the previous assumed models with the Bayesian rule, the probability of the two pixels belonging to the same tissue may be calculated as follows:

$$P(\lambda_x = \lambda_y | \|O_y - O_x\|) = \frac{P(\|O_y - O_x\| | \lambda_x = \lambda_y) \cdot P(\lambda_x = \lambda_y)}{P(\|O_y - O_x\| | \lambda_x = \lambda_y) \cdot P(\lambda_x = \lambda_y) + P(\|O_y - O_x\| | \lambda_x \neq \lambda_y) \cdot P(\lambda_x \neq \lambda_y)}$$

Since $P(\lambda_x=\lambda_y)$ is a prior which can be learned from training data, it can be set to a constant c that is optimized based on the training data. Thus, the probability of the two pixels belonging to the same tissue can be written as:

$$P(\lambda_x = \lambda_y \mid \|O_y - O_x\|) = \frac{c \cdot P(\|O_y - O_x\| \mid \lambda_x = \lambda_y)}{c \cdot P(\|O_y - O_x\| \mid \lambda_x = \lambda_y) + (1-c) \cdot P(\|O_y - O_x\| \mid \lambda_x \neq \lambda_y)}. \quad (3)$$

EQ. (3) can be combined with EQ. (2) to achieve more accurate adaptive filtering.

A flowchart of a method for enhancing virtual non-contrast images acquired through dual source CT scanning is presented in FIG. 1. Referring now to the figure, a method begins at step 11 by receiving the two DS-CT images, $I_H$ and $I_L$, acquired from a single scan. At step 12, a VNC image $I_{VNC}$ is calculated from the high and low energy images from EQ. (1), using knowledge of the tissue attenuation coefficients. At step 13, conditional probability distributions $P(\|O(y)-O(x)\| \mid \lambda_x = \lambda_y)$ and $P(\|O(y)-O(x)\| \mid \lambda_x \neq \lambda_y)$ are estimated based on model probability distributions, such as the Gaussian and uniform distributions described above. These conditional probabilities are used to calculate the a posteriori distribution $P(\lambda_x = \lambda_y \mid \|O(y)-O(x)\|)$ using EQ. (3) at step 14. Finally, at step 15, the a posteriori distribution $P(\lambda_x = \lambda_y \mid \|O(y)-O(x)\|)$ is used in EQ. (2) along with the original VNC image $I_{VNC}$ from step 12 to calculate an enhanced VNC image $\tilde{I}_{VNC}$.

Experimental Results

An algorithm according to an embodiment of the invention was applied to several different dual source CT datasets, including body scans and head scans. Significant improvement to signal-to-noise ratio can be achieved.

Figure 2:
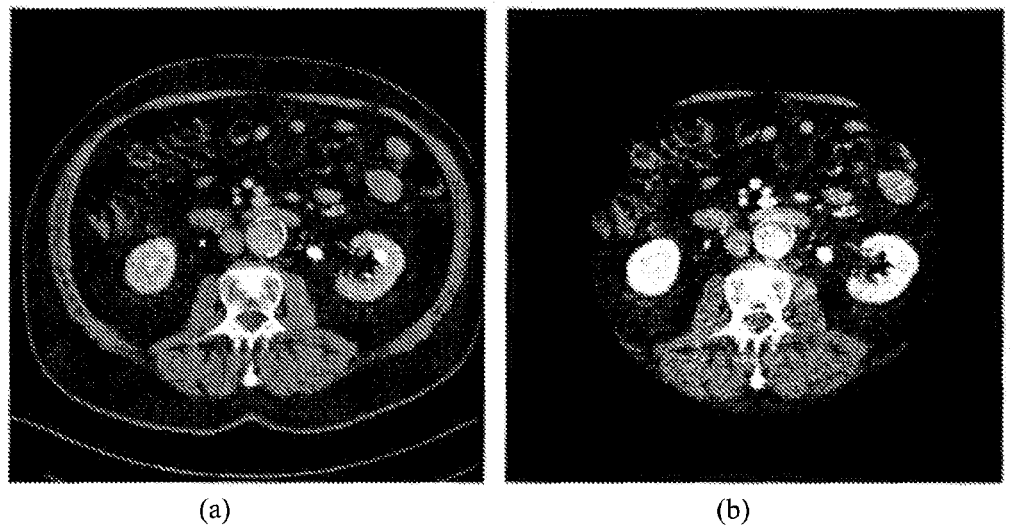
FIGS. 2(a)-(b) depict the high energy and a low energy image of a typical dual source CT body scan, according to an embodiment of the invention.

FIGS. 2(*a*)-(*b*) shows the high energy (FIG. 2(*a*)) and low energy image (FIG. 2(*b*)) of a typical dual source CT body scan. Since the low energy image is acquired from the 2nd detector which is a bit smaller than the first detector in the dual source CT, the low energy image is shown as a circular image containing only the center portion of the body part.

Figure 3:
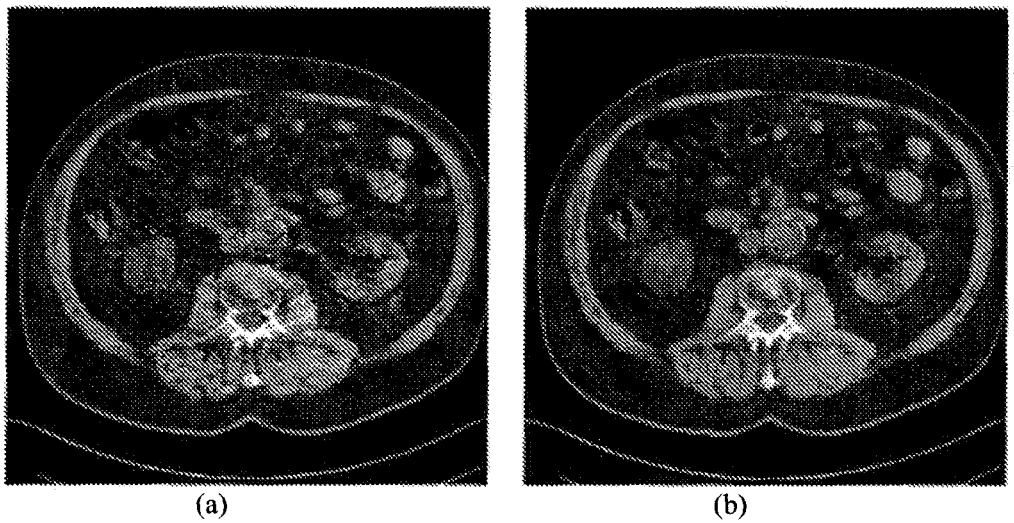
FIGS. 3(a)-(b) depict an original and an enhanced VNC image calculated from the two images for FIGS. 2(a)-(b), according to an embodiment of the invention.

The VNC image calculated from the two images, using only the center circular part, has a weaker signal to noise ratio than the original scans as can be seen in FIGS. 3(*a*)-(*b*). It can be seen from FIGS. 3(*a*)-(*b*) that the enhanced result, depicted in FIG. 3(*b*), shows significant noise reduction and achieves signal-to-noise ratio close to the original high energy scan, shown in FIG. 3(*a*).

Figure 4:
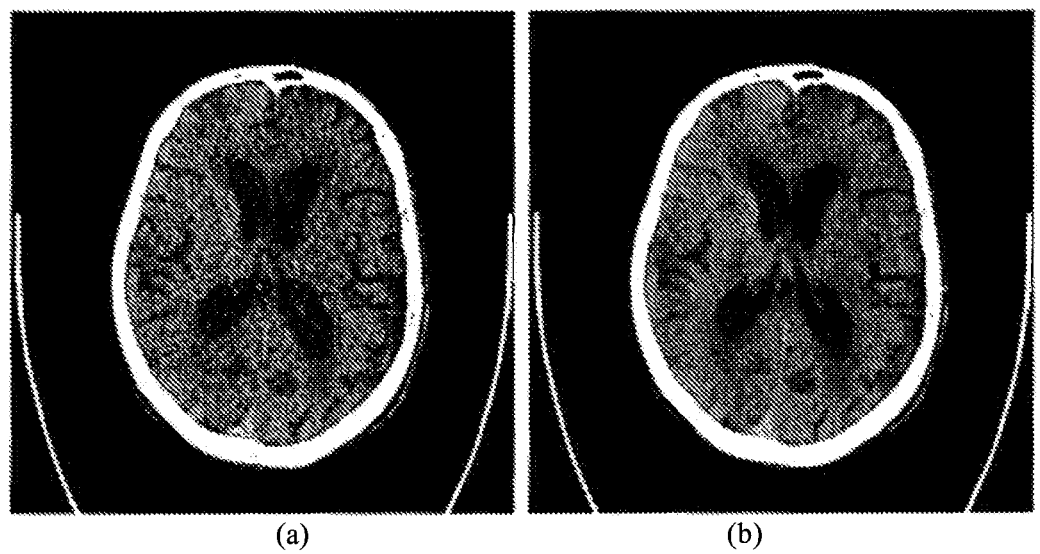
FIGS. 4(a)-(b) depict an original VNC head image and an enhanced VNC head image, according to an embodiment of the invention.

For head scans, the imaging noise properties differ from those of the body scan. With some tuning on the imaging noise model parameters, one can also obtain significant improvement to the VNC image. The result is shown in FIGS. 4(*a*)-(*b*), with the original VNC image shown in FIG. 4(*a*) and the enhanced VNC image shown in FIG. 4(*b*).

It may be seen from these experiments that, with accurate classification of the pixels belonging to different tissue, good noise reduction can be achieved while preserving boundaries and fine structures in the images.

System Implementations

It is to be understood that embodiments of the present invention can be implemented in various forms of hardware, software, firmware, special purpose processes, or a combination thereof. In one embodiment, the present invention can be implemented in software as an application program tangibly embodied on a computer readable program storage device. The application program can be uploaded to, and executed by, a machine comprising any suitable architecture.

Figure 5:
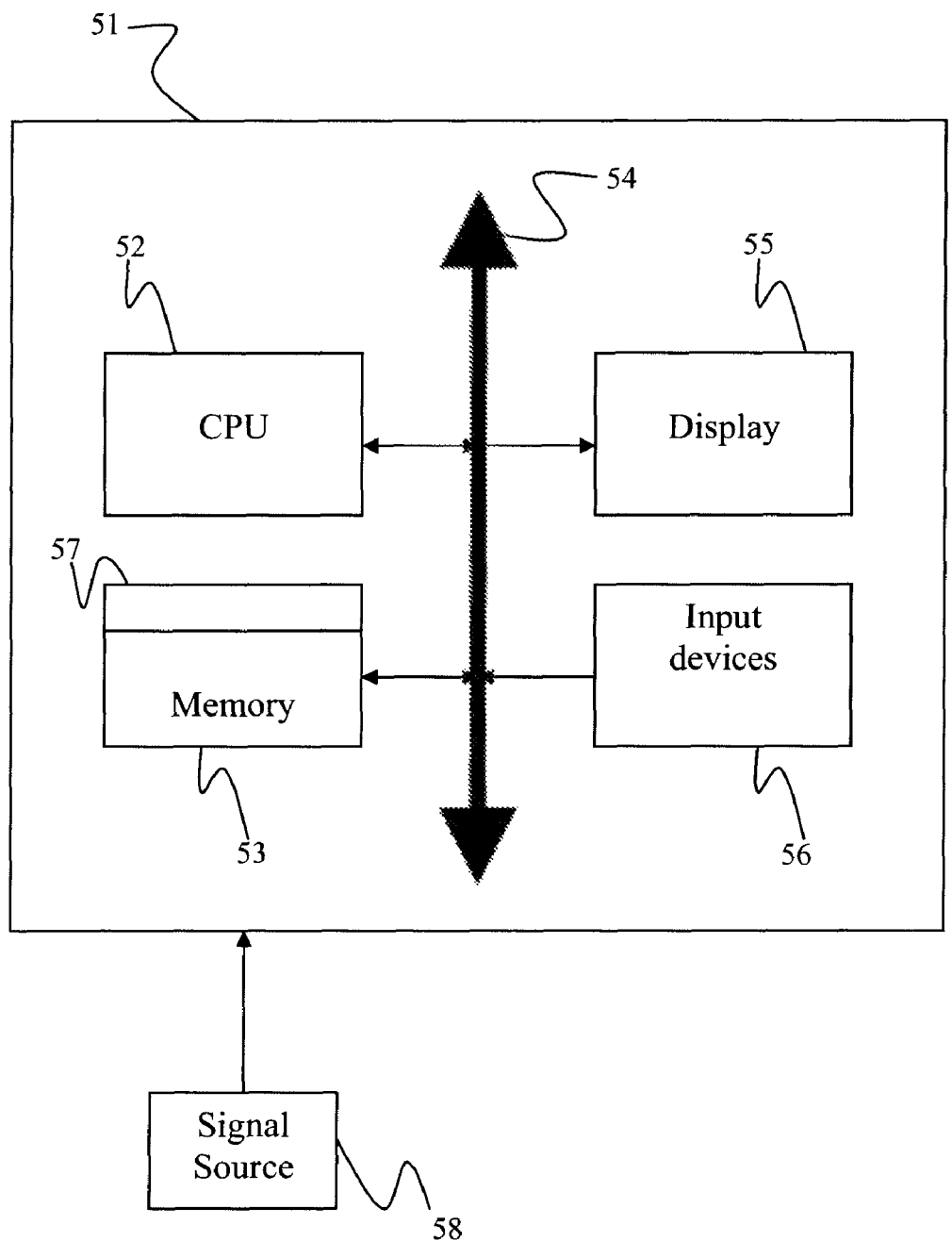
FIG. 5 is a block diagram of an exemplary computer system for implementing a method for virtual non-contrast images acquired through dual source CT scanning, according to an embodiment of the invention.

FIG. 5 is a block diagram of an exemplary computer system for implementing a method for virtual non-contrast images acquired through dual source CT scanning, according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer implemented method for enhancing a virtual non-contrast image, comprising the steps of:
    performing, by one or more computing devices;
    receiving a pair of computed tomography (CT) images acquired using a dual-scan CT apparatus;
    calculating a virtual non-contrast image from the pair of CT images using known tissue attenuation coefficients;
    estimating a conditional probability distribution for tissue at a first point in each of said pair of CT images and said virtual non-contrast image and for tissue at a second point in each of said pair of CT images and said virtual non-contrast image as being the same type;
    estimating a conditional probability distribution for tissue at a first point in each of said pair of CT images and said virtual non-contrast image and for tissue at a second point in each of said pair of CT images and said virtual non-contrast image as being of different types;
    calculating from said conditional probability distributions an a posteriori probability of the tissue at said first point and said second point as being the same type; and
    calculating an enhanced virtual non-contrast image using the a posteriori probability of the tissue at said first point and said second point as being the same type.

2. The method of claim 1, wherein a first image of said pair of images is acquired at a higher energy than a second image of said pair of images, wherein each image comprises a plurality of intensities defined on an N-dimensional grid of points.

3. The method of claim 2, wherein said a posteriori probability of the tissue at said first point and at said second point as being the same type is $$P(\lambda_x = \lambda_y \mid \|O(y) - O(x)\|) = \frac{c \cdot P(\|O(y) - O(x)\| \mid \lambda_x = \lambda_y)}{c \cdot P(\|O(y) - O(x)\| \mid \lambda_x = \lambda_y) + (1-c) \cdot P(\|O(y) - O(x)\| \mid \lambda_x \neq \lambda_y)}$$

wherein $P(\|O(y)-O(x)\| \mid \lambda_x=\lambda_y)$ is said conditional probability distribution for tissue at said first point and at said second point as being of the same type, $P(\|O(y)-O(x)\| \mid \lambda_x \neq \lambda_y)$ is said conditional probability distribution for tissue at said first point and at said second point as being of different types, y is said first point, x is said second point, O(p) is an vector formed from the intensity of the first image at point p, the intensity of the second image at point p, and the intensity of the virtual non-contrast image at point p, $\lambda_p$ is the likelihood of the tissue at point p being of a particular type, wherein p is either y or x, and c represents a predetermined prior probability $P(\lambda_x=\lambda_y)$.

4. The method of claim 2, wherein said enhanced virtual non-contrast image is calculated as $$\tilde{I}_{VNC}(x) = \frac{\sum_{y \in N_x} I_{VNC}(y) \cdot P(\lambda_x = \lambda_y \mid \|O(y) - O(x)\|)}{\sum_{y \in N_x} P(\lambda_x = \lambda_y \mid \|O(y) - O(x)\|)},$$

wherein $\tilde{I}_{VNC}(x)$ is the intensity of said enhanced virtual non-contrast image at point x, $I_{VNC}(y)$ is the intensity of said virtual non-contrast image at point y, $P(\|O(y)-O(x)\| \mid \lambda_x=\lambda_y)$ is said a posteriori probability of the tissue at said first point and at said second point as being the same type, y is said first point, x is said second point, O(p) is an vector formed from the intensity of the first image at point p, the intensity of the second image at point p, and the intensity of the virtual non-contrast image at point p, and $\lambda_p$ is the likelihood of the tissue at point p being of a particular type, wherein p is either y or x.

5. The method of claim 1, wherein said conditional probability distribution for tissue at said first point and at said second point as being of the same type is a Gaussian distribution.

6. The method of claim 1, wherein said conditional probability distribution for tissue at said first point and at said second point as being of different types is a uniform distribution.

7. The method of claim 2, wherein said virtual non-contrast image $I_{VNC}$ is calculated as $$I_{VNC} = \frac{(d \cdot I_1 - b \cdot I_2)}{ad - bc},$$

wherein a and c are tissue attenuation coefficients for the virtual non-contrast image for the first and second images, respectively, and b and d are tissue attenuation coefficients in the presence of a contrast medium for the first and second images, respectively.

8. A computer implemented method for enhancing a virtual non-contrast image, comprising the steps of:
performing, by one or more computing devices;
receiving a pair of computed tomographry (CT) images acquired using a dual-scan CT apparatus, wherein a first image of said pair of images acquired at a higher energy than a second image of said pair of images, wherein each image comprises a plurality of intensifies defined on an N-dimensional: grid of points;
calculating a virtual non-contrast image from the pair of CT images using known tissue: alternation coefficients;
calculating an enhanced virtual non-contrast image from $$\tilde{I}_{VNC}(x) = \frac{\sum_{y \in N_x} I_{VNC}(y) \cdot P(\lambda_x = \lambda_y \mid \|O(y) - O(x)\|)}{\sum_{y \in N_x} P(\lambda_x = \lambda_y \mid \|O(y) - O(x)\|)},$$

wherein $\tilde{I}_{VNC}(x)$ is the intensity of said enhanced virtual non-contrast image at point x, $I_{VNC}(y)$ is the intensity of said virtual non-contrast image at point y, $P(\|O(y)-O(x)\| \mid \lambda_x=\lambda_y)$ is an a posteriori probability of the tissue at said first point and at said second point as being the same type, y is said first point, x is said second point, O(p) is an vector formed from the intensity of the first image at point p, the intensity of the second image at point p, and the intensity of the virtual non-contrast image at point p, wherein p is either y or x, and $\lambda_p$ is the likelihood of the tissue at point p being of a particular type.

9. The method of claim 8, wherein $P(\|O(y)-O(x)\| \mid \lambda_x=\lambda_y)$ is calculated as $$P(\lambda_x = \lambda_y \mid \|O(y) - O(x)\|) = \frac{c \cdot P(\|O(y) - O(x)\| \mid \lambda_x = \lambda_y)}{c \cdot P(\|O(y) - O(x)\| \mid \lambda_x = \lambda_y) + (1-c) \cdot P(\|O(y) - O(x)\| \mid \lambda_x \neq \lambda_y)}$$

wherein $P(\|O(y)-O(x)\| \mid \lambda_x=\lambda_y)$ is a conditional probability distribution for tissue at said first point and at said second point as being of the same type, $P(\|O(y)-O(x)\| \mid \lambda_x \neq \lambda_y)$ is said conditional probability distribution for tissue at said first point and at said second point as being of different types, and c represents a predetermined prior probability $P(\lambda_x=\lambda_y)$.

10. A program storage device readable by a computer, tangibly embodying a program of instructions executable by the computer to perform the method steps for enhancing a virtual non-contrast image, the method comprising the steps of:
receiving a pair of computed tomography (CT) images acquired using a dual-scan CT apparatus;
calculating a virtual non-contrast image from the pair of CT images using known tissue attenuation coefficients;
estimating a conditional probability distribution for tissue at a first point in each of said pair of CT images and said virtual non-contrast image and for tissue at a second point in each of said pair of CT images and said virtual non-contrast image as being the same type;
estimating a conditional probability distribution for tissue at a first point in each of said pair of CT images and said virtual non-contrast image and for tissue at a second point in each of said pair of CT images and said virtual non-contrast image as being of different types;
calculating from said conditional probability distributions an a posteriori probability of the tissue at said first point and said second point as being the same type; and
calculating an enhanced virtual non-contrast image using the a posteriori probability of the tissue at said first point and said second point as being the same type.

11. The computer readable program storage device of claim 10, wherein a first image of said pair of images is acquired at a higher energy than a second image of said pair of images, wherein each image comprises a plurality of intensities defined on an N-dimensional grid of points.

12. The computer readable program storage device of claim 11, wherein said a posteriori probability of the tissue at said first point and at said second point as being the same type is $$P(\lambda_x = \lambda_y \mid \|O(y) - O(x)\|) = \frac{c \cdot P(\|O(y) - O(x)\| \mid \lambda_x = \lambda_y)}{c \cdot P(\|O(y) - O(x)\| \mid \lambda_x = \lambda_y) + (1-c) \cdot P(\|O(y) - O(x)\| \mid \lambda_x \neq \lambda_y)}$$

wherein $P(\|O(y)-O(x)\| \mid \lambda_x=\lambda_y)$ is said conditional probability distribution for tissue at said first point and at said second point as being of the same type, $P(\|O(y)-O(x)\| \mid \lambda_x \neq \lambda_y)$ is said conditional probability distribution for tissue at said first point and at said second point as being of different types, y is said first point, x is said second point, O(p) is an vector formed from the intensity of the first image at point p, the intensity of the second image at point p, and the intensity of the virtual non-contrast image at point p, $\lambda_p$ is the likelihood of the tissue at point p being of a particular type, wherein p is either y or x, and c represents a predetermined prior probability $P(\lambda_x=\lambda_y)$.

13. The computer readable program storage device of claim 11, wherein said enhanced virtual non-contrast image is calculated as $$\tilde{I}_{VNC}(x) = \frac{\sum_{y \in N_x} I_{VNC}(y) \cdot P(\lambda_x = \lambda_y \mid \|O(y) - O(x)\|)}{\sum_{y \in N_x} P(\lambda_x = \lambda_y \mid \|O(y) - O(x)\|)},$$

wherein $\tilde{I}_{VNC}(x)$ is the intensity of said enhanced virtual non-contrast image at point x, $I_{VNC}(y)$ is the intensity of said virtual non-contrast image at point y, $P(\|O(y)-O(x)\| \mid \lambda_x=\lambda_y)$ is said a posteriori probability of the tissue at said first point and at said second point as being the same type, y is said first point, x is said second point, O(p) is an vector formed from the intensity of the first image at point p, the intensity of the second image at point p, and the intensity of the virtual non-contrast image at point p, and $\lambda_p$ is the likelihood of the tissue at point p being of a particular type, wherein p is either y or x.

14. The computer readable program storage device of claim 10, wherein said conditional probability distribution for tissue at said first point and at said second point as being of the same type is a Gaussian distribution.

15. The computer readable program storage device of claim 10, wherein said conditional probability distribution for tissue at said first point and at said second point as being of different types is a uniform distribution.

16. The computer readable program storage device of claim 11, wherein said virtual non-contrast image $I_{VNC}$ is calculated as $$I_{VNC} = \frac{(d \cdot I_1 - b \cdot I_2)}{ad - bc},$$

wherein a and c are tissue attenuation coefficients for the virtual non-contrast image for the first and second images, respectively, and b and d are tissue attenuation coefficients in the presence of a contrast medium for the first and second images, respectively.

* * * * *